(12) United States Patent
Byford

(10) Patent No.: US 9,409,828 B1
(45) Date of Patent: Aug. 9, 2016

(54) METHOD FOR TREATING ANIMAL WASTE AND OTHER WASTE STREAMS

(71) Applicant: Leo Byford, Tulsa, OK (US)

(72) Inventor: Leo Byford, Tulsa, OK (US)

(*) Notice: Subject to any disclaimer, the term of this patent is extended or adjusted under 35 U.S.C. 154(b) by 0 days.

(21) Appl. No.: 14/616,956

(22) Filed: Feb. 9, 2015

Related U.S. Application Data

(60) Provisional application No. 61/937,262, filed on Feb. 7, 2014.

(51) Int. Cl.
*C05F 17/00* (2006.01)
*C05F 3/00* (2006.01)
*C05G 3/00* (2006.01)

(52) U.S. Cl.
CPC . *C05F 3/00* (2013.01); *C05F 17/00* (2013.01); *C05G 3/0058* (2013.01)

(58) Field of Classification Search
None
See application file for complete search history.

(56) References Cited

U.S. PATENT DOCUMENTS

| | | | | |
|---|---|---|---|---|
| 3,905,796 | A * | 9/1975 | Ghelfi | C05F 3/00 71/21 |
| 5,443,613 | A * | 8/1995 | Robinson | 71/12 |
| 5,501,718 | A * | 3/1996 | Bandurski | 71/9 |
| 6,626,974 | B1 * | 9/2003 | Byford | 71/11 |
| 7,906,129 | B2 * | 3/2011 | Yamashita | 424/405 |
| 9,005,536 | B1 * | 4/2015 | Rogers | C10J 3/32 422/186.21 |
| 2003/0070461 | A1 * | 4/2003 | Ferguson | C05F 3/00 71/21 |
| 2004/0250580 | A1 * | 12/2004 | Majima | 71/10 |
| 2009/0031616 | A1 * | 2/2009 | Agblevor | C05D 9/00 44/307 |
| 2010/0326151 | A1 * | 12/2010 | Madigan et al. | 71/8 |
| 2011/0239655 | A1 * | 10/2011 | Carin | C05F 3/00 60/772 |
| 2013/0055635 | A1 * | 3/2013 | Harman | A01G 31/001 47/58.1 R |
| 2014/0196512 | A1 * | 7/2014 | Shaimukhambetova | 71/9 |
| 2015/0047402 | A1 * | 2/2015 | Walker et al. | 71/10 |

FOREIGN PATENT DOCUMENTS

CN 103193527 * 7/2013

* cited by examiner

*Primary Examiner* — Wayne Langel
(74) *Attorney, Agent, or Firm* — GableGotwals

(57) ABSTRACT

A composition of one or more farm animal waste streams is made by bio-digesting the stream and then granulizing it, the granulized product being in a range of 0.1 to 0.5 inches in diameter and having a moisture content no greater than 15% or, more preferably, no greater than 7%. The method for making the composition includes the steps of (i) processing the farm animal waste stream in a bio-digester and (ii) granulizing the bio-digested farm animal waste stream. The bio-digester is preferably at a high temperature in a range of 160° to 180° F. The bio-digested farm animal waste stream can be mixed with a binding material such as coal-ash, sawdust, or an equivalent. The composition can then be applied subsurface using a box or air seeder.

10 Claims, No Drawings

METHOD FOR TREATING ANIMAL WASTE AND OTHER WASTE STREAMS

CROSS-REFERENCE TO CO-PENDING APPLICATIONS

This application claims the benefit of U.S. Prov. Pat. Appl. 61/937,262 filed Feb. 7, 2014.

BACKGROUND OF THE INVENTION

This invention relates to animal waste compositions and methods for treating animal waste and other waste streams so that the waste can be applied sub-surface. Prior art animal waste compositions are suited for surface application. Surface application methods are not as effective in delivering nutrients to the plant as are sub-surface applications. Surface application also results in runoff that finds its way into neighboring watersheds.

SUMMARY OF THE INVENTION

A composition made according to this invention includes one or more farm animal waste streams such as chicken litter that have been bio-digested and then granulized, the granulized chicken litter being circular in a range of 0.1 to 0.5 inches in diameter, or up to 1 inch or larger in diameter for disking or bottom plow application, and having a moisture content no greater than 15% or, more preferably, no greater than 7%.

A method for making the composition includes the steps of (i) processing the farm animal waste stream in a bio-digester and (ii) granulizing the bio-digested farm animal waste stream. The bio-digester is preferably at a high temperature in a range of 160° to 180° F. The bio-digested farm animal waste stream can be mixed with a binding material such as coal-ash, sawdust, or an equivalent.

The composition is can be applied sub-surface using a box or air seeder. The depth of the sub-surface application is preferably at least 2 inches below surface level but can be up to 18 inches below surface level in disking, bottom plowing, or a "knifing" application similar to that used by trenching machines when laying cable.

DETAILED DESCRIPTION OF THE PREFERRED EMBODIMENTS

A composition made according to this invention includes a granulized product of farm animal waste packaged or arranged for sub-surface application. The granulized product is preferably in a range of 0.1 to 0.5 inches in diameter (or up to 1 inch or larger for disking or bottom plow application) and has a moisture content of 15% or less or, more preferably, 7% or less. The animal waste used in the product can include, but is not limited to chicken, swine, or cattle waste, and a single kind of animal waste can be used (e.g. chicken litter alone) or mixed with one or more other kinds of animal waste. The granulized product can also include green waste from trees, grass, or leaves or paper or wood waste. The product may also include a binder material such as coal ash, sawdust, or its equivalent.

A method for treating a waste stream from a drinking water treatment plant; a waste stream from an agricultural farm housing farm animals including, but not limited to, chickens, swine, or cattle; green waste from trees, grass, or leaves; paper or wood waste; or some combination of the above waste streams and waste sources, the method including the steps of:

(i) processing the waste in a bio-digester at high temperature preferably in a range of 160-180° F.;
(ii) optionally mixing the bio-digested waste with coal ash, sawdust or an equivalent binder material;
(iii) drying the resulting processed bio-digested waste or mixture (which can occur during the granulizing step);
(iv) granulizing the dried bio-digested waste or mixture to a granulized product preferably in a range of 0.1 to 0.5 inches in diameter (or up to 1 inch or larger for disking or bottom plow application); and
(v) applying the granulized product in a soil, preferably 2 to 4 inches below surface level of the soil but could be up to 12 to 18 inches below surface level.

The soil may be prepared by disking, or bottom plowing, or a "knifing" application similar to that used by trenching machines when laying cable. The granulized product also may be mixed with water prior to its subsurface application. More preferably, the granulized product is applied using a box or air seeder of the type well-known in the art so that no-till farming can be practiced. The product can be applied before, during, or after seeding or planting.

An example of a compost that is well suited for the above method is found in U.S. Pat. No. 6,626,974 B1 to Byford, the subject matter of which is hereby incorporated by reference.

Because of the added process steps in making the composition, the composition has higher quality than a same waste stream arranged to be applied wet and at the surface. The method of sub-surface application improves the effect of the composition because the composition is absorbed through the root system. Last, the method eliminates migration of the waste to watersheds.

What is claimed:

1. A method for treating chicken litter, the method comprising the steps of:
   (i) processing the chicken litter in a bio-digester; and
   (ii) granulizing the bio-digested chicken litter to a moisture content no greater than 7%;
   (iii) sizing the granulized bio-digested chicken litter to a size appropriate for sub-surface application with an air or box seeder; and
   (iv) applying the granulized product sub-surface with the air or box seeder, a depth of the sub-surface application being at least 2 inches below surface level.

2. A method according to claim 1 wherein a temperature of the bio-digester is at least 160° F.

3. A method according to claim 2 wherein the temperature is no greater than 180° F.

4. A method according to claim 1 further comprising the step of mixing the bio-digested chicken litter with a binder material.

5. A method according to claim 1 wherein a depth of the sub-surface application is no greater than 18 inches below surface level.

6. A method for disposing of chicken litter, the method including the steps of applying the chicken litter at least two inches below ground level, the chicken litter being granulized and sized for use in an air or box seeder and having a moisture content no greater than 7%.

7. A method according to claim 6 wherein the applying step is a no-till step.

8. A method for disposing of chicken litter, the method consisting of the steps of:
   applying granulized chicken litter sub-surface with an air or box seeder, a depth of the sub-surface application being at least 2 inches below surface level, wherein the granulated chicken litter has a moisture content no greater than 7%.

9. A method according to claim 8 wherein the applying step is a no-till step.

10. A method according to claim 8 wherein a depth of the sub-surface application is no greater than 18 inches below surface level.

\* \* \* \* \*